W. F. NORMAN.

GRAVE MARKER.

APPLICATION FILED DEC. 3, 1919.

Reissued Mar. 30, 1920. 14,827.

Inventor

William F. Norman

Witness

Ed. R. Lusby

By David Pettit Moore

Attorney

UNITED STATES PATENT OFFICE.

WILLIAM F. NORMAN, OF NEVADA, MISSOURI.

GRAVE-MARKER.

14,827. Specification of Reissued Letters Patent. Reissued Mar. 30, 1920.

Original No. 1,276,798, dated August 27, 1918, Serial No. 187,455, filed August 21, 1917. Application for reissue filed December 3, 1919. Serial No. 342,235.

*To all whom it may concern:*

Be it known that I, WILLIAM F. NORMAN, a citizen of the United States, residing at Nevada, in the county of Vernon and State of Missouri, have invented certain new and useful Improvements in Grave-Markers, of which the following is a specification, reference being had therein to the accompanying drawing.

This invention relates to improvements in grave markers, one object of the invention being the provision of a temporary marker especially adapted for use in connection with temporary graves.

A further object of this invention is the provision of a marker of this type which is provided with a supporting member carrying a name plate of novel construction, the piercing end of the supporting member being so constructed as to permit of the easy sticking of the marker in the earth and the support thereof after being placed in position.

A still further object of this invention is the provision of a device of this character which is simple and inexpensive in construction and readily placed in use.

Figure 1:
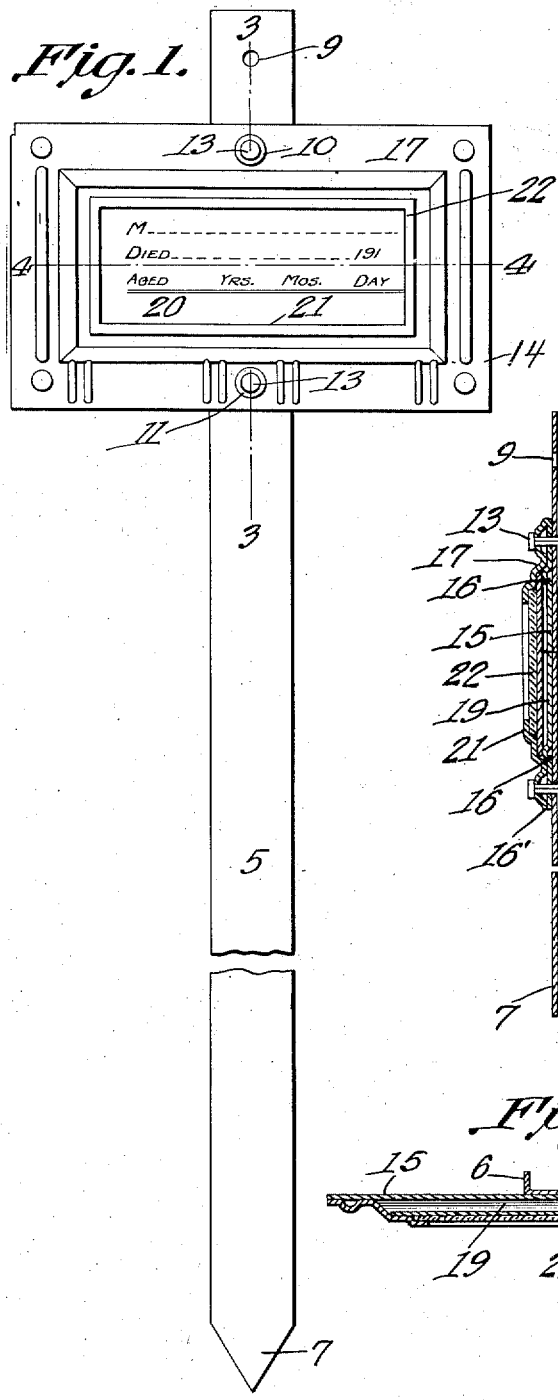
Figure 1 is a front elevation of the complete marker.
Figure 2:
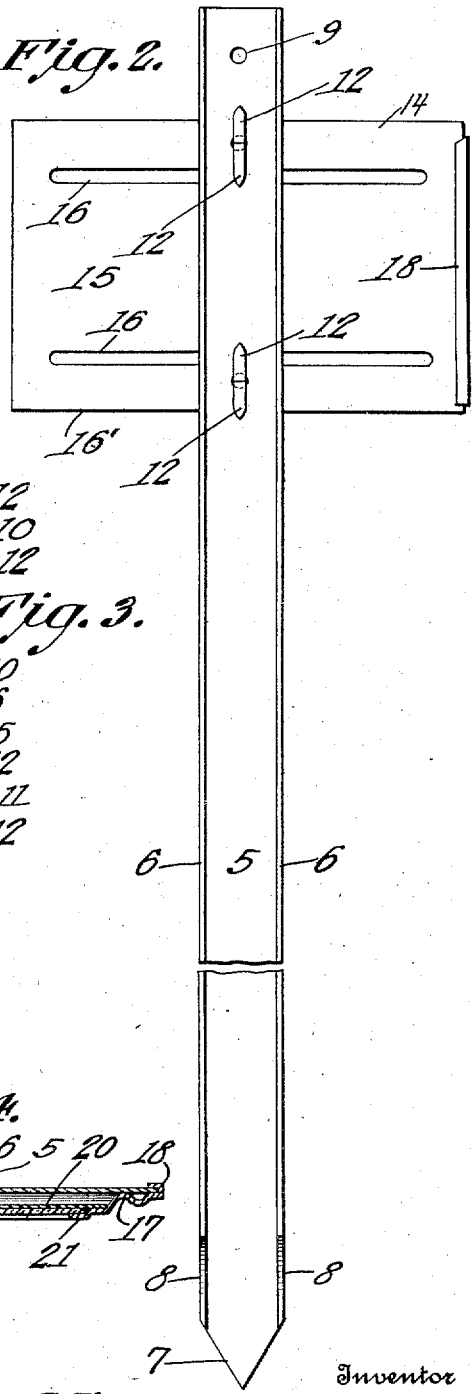
Fig. 2 is a rear elevation thereof.
Figure 3:
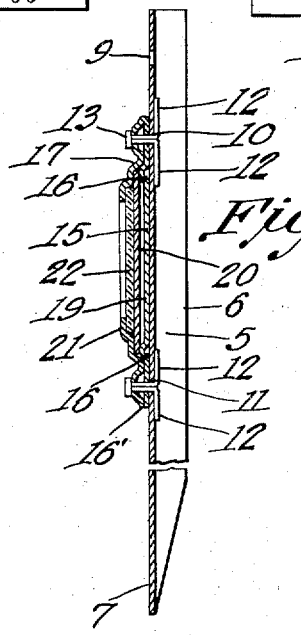
Fig. 3 is a section taken on line 3—3 of Fig. 1.
Figure 4:
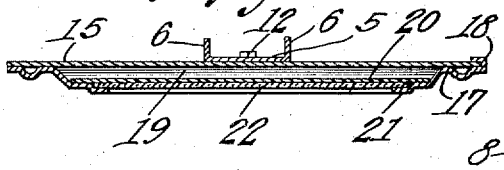
Fig. 4 is a section taken on line 4—4 of Fig. 1.

Referring to the drawings, the numeral 5 designates the supporting member which is made from a single piece of metal and bent to provide the two parallel flanges 6 with the entering point 7, the lower edges of the flanges being beveled as at 8 to assist in the introduction of the supporting member in the earth.

The supporting member is further provided with the three openings 9, 10 and 11, the opening 9 constituting a means whereby an emblem or other ornament may be attached, while the other openings are adapted to receive the terminals 12 of the rivets 13 which support the card carrying member 14 upon the member 5.

The card carrying member consists of a single sheet of metal bent to provide the rear wall 15 having the longitudinal reinforced depressions 16 and the inturned edge 16′. The front wall 17 is bent co-extensively with the rear wall and is provided with the flange 18 which constitutes a fastening for engaging one end of the rear plate of the member while the lower edge is bent outwardly to provide an opening 19, at the right hand side for the introduction of the sheet 20 which carries the data. The front wall of this member is further depressed outwardly to provide a receptacle 21 to retain the sheet 22 of glass so that the data carrying member is protected thereby. It will thus be seen that the data carrying member is protected from the weather by the peculiar formation of the supporting member in that the top is entirely closed and all other edges are positioned that the rain is drained therefrom.

The front wall is otherwise ornamental so that the device when in place, although temporary, is more ornamental than the ordinary grave indicators or markers.

What I claim as new is:

1. The herein described grave marker including a supporting member and a card carrying member, said card carrying member being made from a single sheet of material divided centrally and longitudinally and bent so that the bent edge forms the top thereof, the front wall being provided with a sight opening, the rim of which is outwardly depressed to coöperate with the rear wall to provide a receptacle for a card index and a transparent covering, there being formed upon one side edge of the front wall a flange for embracing the corresponding edge of the rear wall, both the front and rear wall centrally thereof and at points above and below the opening in the front wall being apertured, and fastening devices in said apertures for attaching the card carrying member to the support.

2. The herein described grave marker including a supporting member and a card carrying member, said card carrying member being made from a single sheet of material divided centrally and longitudinally and bent so that the bent edge forms the top thereof, the front wall being provided with a slight opening, the rim of which is outwardly depressed to coöperate with the rear wall to provide a receptacle for a card index and a transparent covering, there being formed upon one side edge of the front wall a flange for embracing the corresponding edge of the rear wall.

3. In a marker of the class described, a back and a front member forming a card receptacle, one of which members is provided with a sight opening through which a card is observable, there being an opening at one edge between the members for the insertion of a card, and a bendable tongue carried by one of the members adjacent said opening and capable of being bent upon the other member.

In testimony whereof I affix my signature.

W. F. NORMAN.